United States Patent [19]

Waldman

[11] Patent Number: 5,426,691

[45] Date of Patent: Jun. 20, 1995

[54] METHOD AND APPARATUS FOR DETECTING A PRESCRIBED AUDIO FREQUENCY ACTUATING SIGNAL APPLIED ON TO A TELECOMMUNICATION LINE

[76] Inventor: Herbert Waldman, 1739 - 52nd St., Brooklyn, N.Y. 11204

[21] Appl. No.: 221,829

[22] Filed: Apr. 1, 1994

Related U.S. Application Data

[63] Continuation of Ser. No. 728,574, Jul. 11, 1991, abandoned.

[51] Int. Cl.[6] .............................................. H04M 1/64
[52] U.S. Cl. ......................................... 379/67; 379/70; 379/77; 379/79; 379/80; 379/82
[58] Field of Search ...................... 379/67, 88, 68, 70, 379/74, 77, 79, 80, 82

[56] References Cited

U.S. PATENT DOCUMENTS 5,142,564  8/1992  Chu ........................................ 379/88
5,159,626  10/1992  Baum et al. ............................ 379/88

Primary Examiner—James L. Dwyer
Assistant Examiner—Fan Tsang
Attorney, Agent, or Firm—Goodman & Teitelbaum

[57] ABSTRACT

An electrical apparatus, associated with a telecommunications line, includes a unique dual input/dual output prescribed audio actuating signal responsive circuit. The responsive circuit pursuant to a detection of the prescribed signal, in combination with a second signal pursuant to a detection by line pickup detection circuit of an off-hook condition of the telecommunications line, effecting production of an actuating output signal. The actuating signal upon suitable application, effecting an operational function of a suitably coupled associated electrical device. The associated device may be one of a number of electrical devices. In the preferred embodiment of the invention, this device is designated to be a time-day-date-stamp marker signal outputting device. The marker signal may then be recorded by a suitable recording device or, alternatively, not recorded but simply used as an audible time-day-date announcement clock.

6 Claims, 9 Drawing Sheets

BLOCK REPRESENTATION OF A GENERIC SERIAL EMBODIMENT

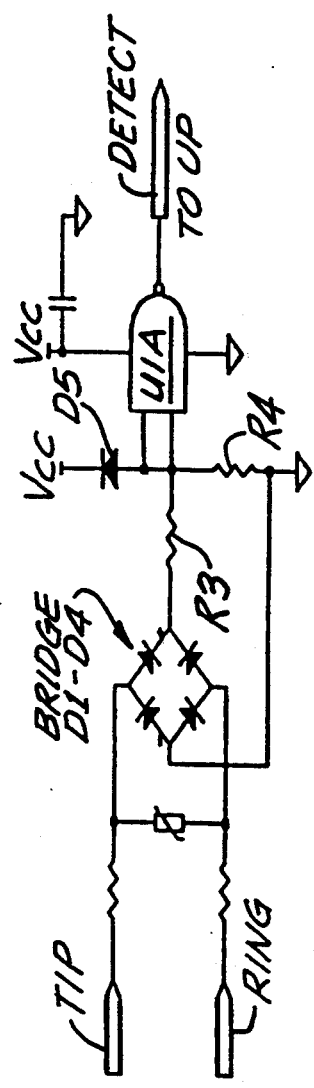
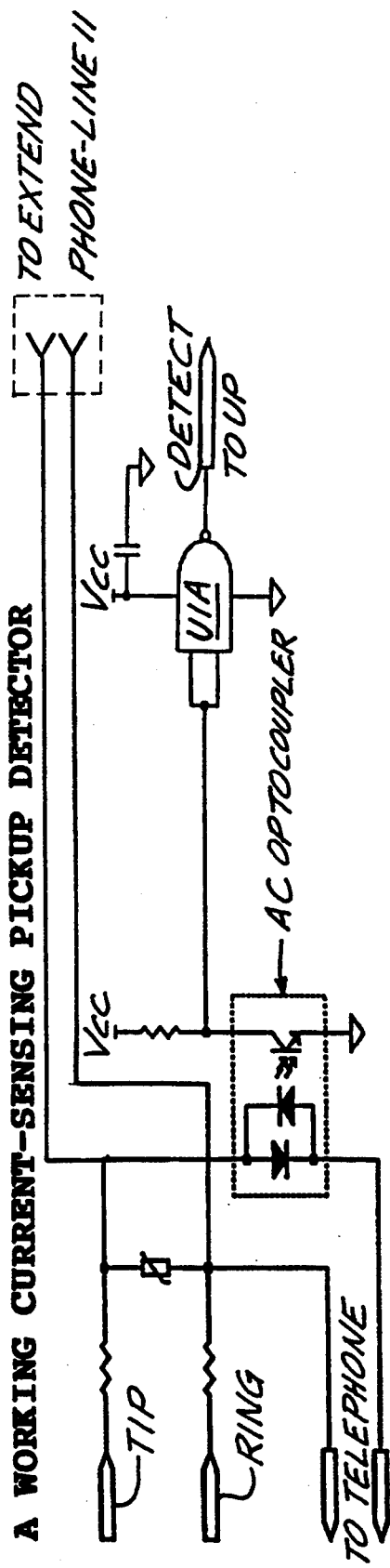

METHOD AND APPARATUS FOR DETECTING A PRESCRIBED AUDIO FREQUENCY ACTUATING SIGNAL APPLIED ON TO A TELECOMMUNICATION LINE

CROSS-REFERENCE TO RELATED APPLICATION

This application is a continuation of application Ser. No. 07/728,574, filed Jul. 11, 1991, now abandoned.

BACKGROUND OF THE INVENTION

This invention relates to telephone devices, especially devices such as telephone answering machines (TADS) and telephone recording devices (TRDs) wherein some signal or conversation is being recorded off the telephone line and some sort of "timestamp" to document the time (and/or day or day-and-date) is often desirable. The preferred apparatus of the invention is embodied to serve this need most concisely by responding automatically to an audio-frequency signal of fixed duration, bandpass and amplitude characteristics typical of the "beep" produced on the telephone line by most TADs at the start of on-line recording, and thereafter using a voice-capable integrated circuit (IC or "chip") to apply an audible timestamp to the telephone line. This timestamp will obviously be recorded by the TAD producing the "beep", thereby producing a suitable audible marker for the user upon playback, making the invention suitable, for instance, for post-equipping a non-timestamp-capable TAD with the function. Additionally, many timestamp-capable TADs place their signals on the recording tape in a digital form designed to be diecoded by the TAD on playback and reproduced in audio or visual form by the TAD, making such timestamps unuseful if the TAD tape is played back on a different device, such as a tape-player. By providing a direct audio timestamp to the tape, the invention circumvents this for users to whom it may be important.

Over the past years great strides have been made in voice-synthesis technology, and many present-day products and systems use it in some form. Many microprocessors and dedicated IC-circuits capable of voice-synthesis are available, either with "custom" (i.e., designer-specified) or "off-the shelf" (i.e., manufacturer-specified) vocabularies. Most such microprocessors are also, with suitable timing means (e.g., a crystal producing a "time-keeping" frequency such as 32.768 KHz or 7.3728 MHz), capable of maintaining the time, day-of-week and calendar functions for the device, and many dedicated "clock" and "clock/calendar" ICs are similarly available. Likewise, there are many microprocessors and ICs capable of performing the timing and Analog-to-Digital functions for determining the duration, amplitude, bandpass and frequency characteristics of a telephone line signal, although such signals can as easily (as shown in the embodiments herein) be detected and decoded by less complex dedicated circuitry. Thus, as one will understand, a wide variety of such technologies is available to the present-day systems-designer for implementing the voice-synthesis and other functions desirable to the invention, and the prior art is cognizant of many techniques and applications thereof.

It is understood, of course, that there are many millions of non-timestamp-capable TADs in use throughout the world, and any technique which enables the user to cost-effectively postequip such a TAD with timestamp capability will enhance the usefullness and prolong the service life of such devices for users who find the capability retrospectively desirable. Additionally, since it is obviously possible to combine a "manual" or "pushbutton" timestamp application along with such automatic "beep" responses, such a device would also be convenient to users of TRDs (such as detectives and insurance claims agents) who spend a good deal of their time recording important conversations for legal reasons. Lastly, since an external speaker could easily be interfaced to such a device along with a telephone audio interface, such a device could obviously function as a more traditional "talking clock" along with its primary functions.

The apparatus and methods to be described enable audio timestamp information to be passed to a variety of recording devices both automatically and manually. Numerous examples of appropriate technology are readily available in independent forms well known to the state of the art, and they can be married in a wide variety of ways to accomplish the precepts of the invention.

SUMMARY OF THE INVENTION

As one can understand, the main object of the invention is to advantageously utilize the characteristics of the many low-cost voice-generation technologies available at the present time in order to provide consumers a less expensive alternative to replacing non-timestamp-capable TADs with timestamp-capable models. The primary functional objective of the invention is therefore to provide a device which can conveniently, cost-effectively, and automatically apply an audio timestamp to a TAD tape via the TAD's ordinary phone-line connection.

In a system comprising at least a time-stamp-capable apparatus associated with a telephone line, said apparatus including responsive means responding to a signal of a minimum duration and certain other characteristics, said apparatus thereafter delivering a time-stamp to said telephone line. The apparatus illustrated in FIGS. 7a, 7b and 8a, 8b, for example, accomplishes this most strongly by producing an internal digital signal in response to detection of a "pickup" on the telephone line, and a second internal digital signal in response to the detection of an audio signal on the telephone line of at least 0.5 seconds duration, a bandpass of approximately 700+ Hz, and a continuous amplitude at or above that of typical converstion. The logical ANDing of these two internal signals is used to automatically trigger the timestamping means of the apparatus, thereby providing such timestamp whenever an associated TAD or other apparatus is "on-line" and "beeps". A "beep" detection apparatus as illustrated in FIG. 6 can further enhance detection by employing the debounced logical ANDing of a "steady-state" detector and a simple audio detector to isolate a "beep" with very high reliability. The primary concern of the system of the instant invention is thus as an external, line-associated adjunct to a traditional TAD, and the primary concern of the exemplary apparatus is to service this need concisely by detecting appropriate triggering conditions produced by such a TAD, thereafter delivering an audible "voice timestamp to the TAD via the associated telephone line.

BRIEF DESCRIPTION OF THE DRAWINGS

FIG. 3 is a schematic of a working voltage-sensing Pickup Detector.

FIG. 4 is a schematic of a working current-sensing Pickup Detector.

STATE OF THE ART COMPONENTS

All the elements and modules of the system of the invention are well known individually in the state of the art, and are therefore (except in the schematic representations of actual implementations of the invention) shown in block form without delving into the details of their design and construction. This approach is used in order to facilitate the clarity and simplicity of the specification and to avoid undue cluttering of the drawings. Power supplies and external line or data interfaces (such as phone-line connections) are similarly not shown, except in block form where necessary.

DETAILED DESCRIPTION OF THE PREFERRED EMBODIMENTS

Figure 1:
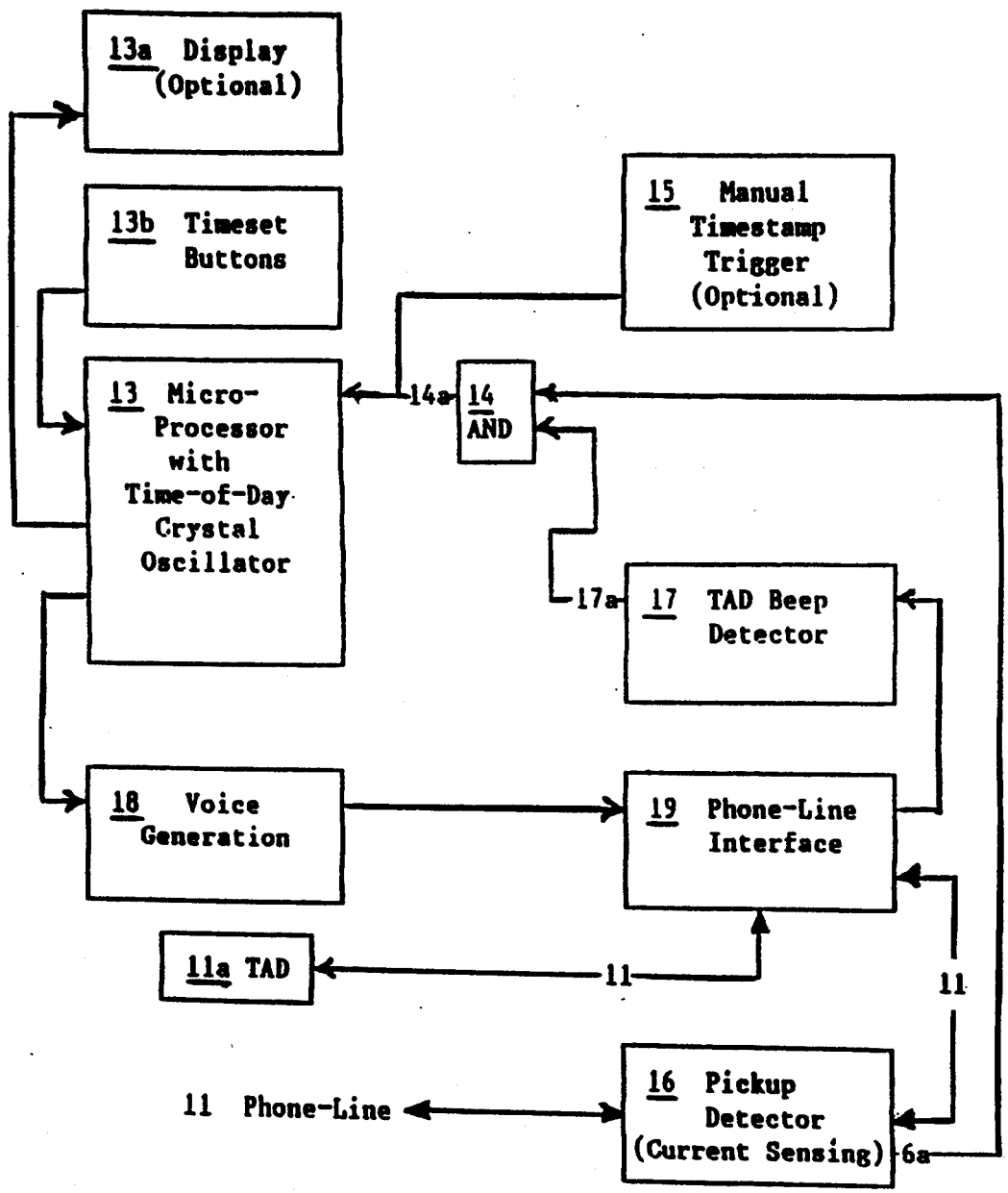
FIG. 1 is an example block-representation of a generic "serial" embodiment of the invention.

FIG. 1 is an example block-representation of a generic "serial" embodiment of the invention. In normal automatic operation, a current flows on the Phone-Line (11) through the Line Interface (19) toward the TAD (11a) when the TAD goes off-hook. This current also flows through the Pickup Detector (16) whose output (6a) becomes active in response. Having answered, a typical TAD will then play out a user-defined message ending in an audio-frequency "beep" just prior to recording. The output (17a) of the Beep Detector (17) becomes active in response to this signal, and with both the signals into the logical AND (14) now true, the output (14a) goes true, alerting the Microprocessor (13) that the TAD is now ready to record and a timestamp must be applied to the line. The Microprocessor (13), which is keeping time internally, waits for the end of the signal (the AND (14) will go false when the Beep Detector (17) output goes false at the end of the beep) and assembles a string of data corresponding to the time, passing it to the Voice Generator (18) which then "speaks" the data to the line via the Line Interface (19). In this simple implementation, a Manual Trigger (15) button may also be used to "fool" the microprocessor, which will then "speak" on demand for use with TRDs or other devices not producing a beep. A Display (13a) may optionally be incorporated. The Timeset Buttons (13b) are used to set the time and calendar data in the Microprocessor (13). Note that a clock/calendar IC slaved to the Microprocessor (13) could be used as easily for external timekeeping.

Figure 2:
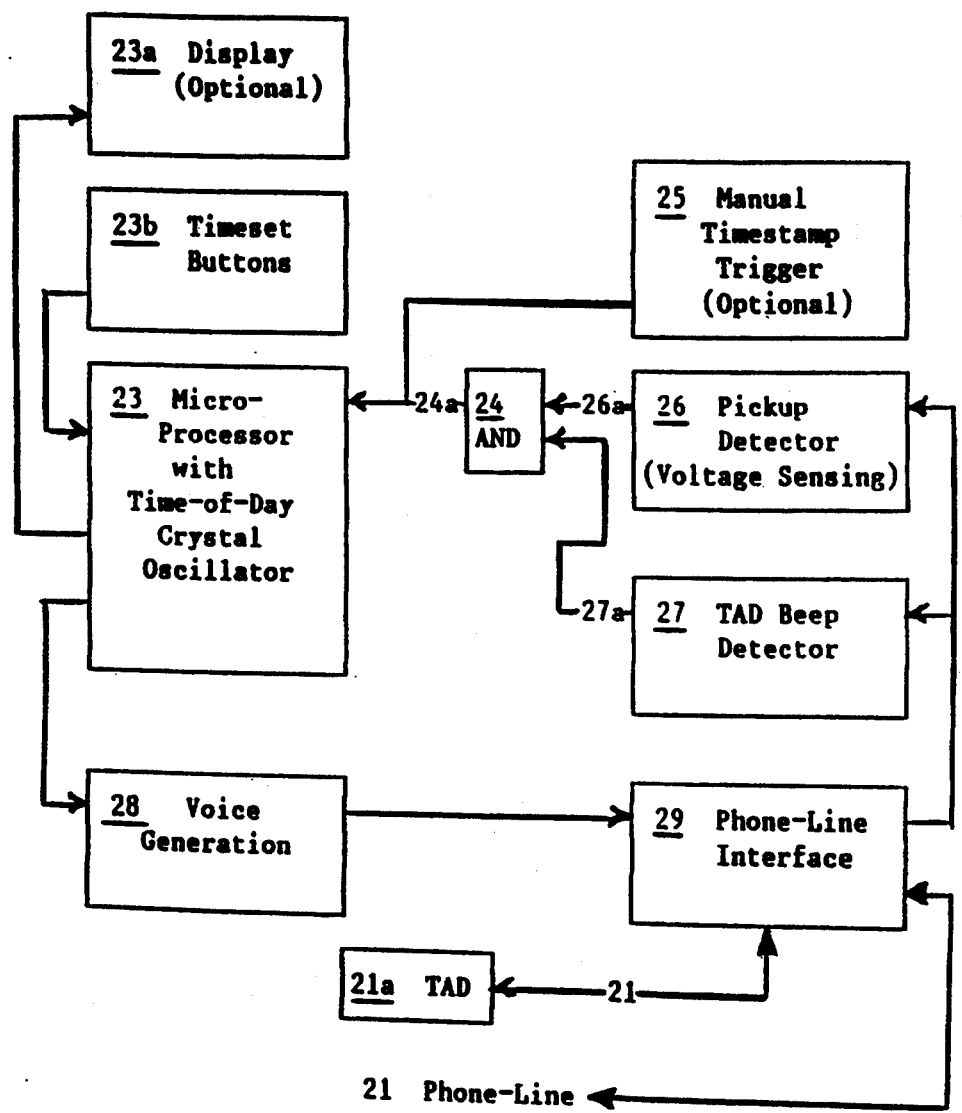
FIG. 2 is an example block-representation of a generic "parallel" embodiment of the invention.

FIG. 2 is an example block-representation of a generic "parallel" embodiment of the invention. Note that the only difference between this and the "serial" implementation in FIG. 1 is that the Pickup Detector (26) is voltage sensing and is located in parallel with the Line (21). While this means that any device on the line (not necessarily the TAD) will cause detection of a pickup, the Beep Detector will still prevent the device from responding to other phones or devices. If necessary (e.g., if the rejection characteristics of the Beep Detector were insufficient to reliably prevent false detections alone) this rejection could be further enhanced by some timing (e.g., designing the circuit to respond only with x many seconds of a pickup).

FIG. 3 is a schematic of a working voltage-sensing Pickup Detector using a bridge (D1-D4) to make the detector polarity-independent from the line. R3 and R4 function together as a simple voltage divider, which is clamped to approximate Vcc by D5. At 48 VDC on the phone line (on-hook voltage) this applies approximate Vcc (logic 1) to the inputs of U1A (one gate-pair of a common 4011 NAND). When phone line voltage drops below 10 VDC (off-hook voltage) the divider causes the gate-pair to sense a logic 0, inverting the state of the output and signalling the off-hook condition to other circuitry.

FIG. 4 is a schematic of a working current-sensing Pickup Detector using an AC optocoupler (IS01). Any meaningful current flow through the telephone line will power one or the other of the LEDs in the opto, causing the internal transistor to conduct and applying a logic 0 to the (normally pulled-up) gate-pair of the associated 4011 NAND, inverting the state of the output and signalling the off-hook condition to other circuitry. It is noted, in addition to the output (6a), FIG. 4 also shows the output to extend the Phone-Line (11) to the Phone-Line Interface (19), as indicated in FIG. 1.

Figure 5:
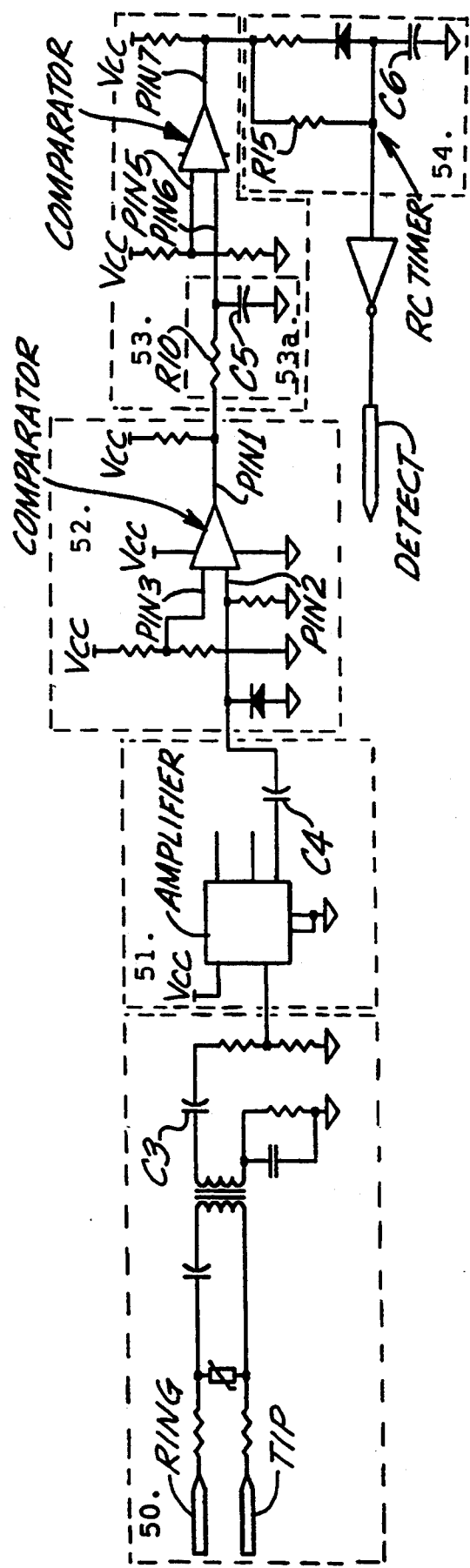
FIG. 5 is a schematic of a working "Beep" Detector.

FIG. 5 is a schematic of a working "Beep" Detector using a common LM393 comparator. Block 50 is a transformer-coupled telephone line interface of a type well known to the state of the art, which passes AC signals on the line to Block 51 via C3. Block 51 is an amplifier using an LM386, also very well known to the state of the art, which provides a 20 dB signal gain to the detector blocks via C4. The first of these, Block 52, uses the pin 2-3 comparator-pair of the 393 with the plus leg (pin 3) as the voltage reference and the minus leg (pin 2) pulled down when no signal is present from the amplifier. This causes the output (pin 1) to assume a logic 1 when quiescent, causing capacitor C5 in Block 53a to charge. When an AC signal appears at the input (pin 2) of the 393, it causes the output (pin 1) to produce a variable-duty-cycle square-wave of that frequency. C5 discharges through R10 in response, assuming a DC voltage level dependent on the square-wave characteristics. The comparator-pair 5-6 is sensitive to this voltage according to its own reference (pin 6), with the referent normally being lower than the input, and the output (pin 7) therefore being low when quiescent. Additionally, the reference voltage applied to pin 3 of the 393 acts as an amplitude filter, since it controls the pin 2 voltage threshhold which will cause the output to transition. The circuit therefore offers full control over the amplitude and low-pass frequency of admitted signals. Finally, Block 54 acts as an RC timer according to the values of C6 and R15, the characteristics of which will cause signals passed by the 393 but persisting less than a given time (approximately 0.5 seconds with the values shown) to be rejected.

Figure 6:
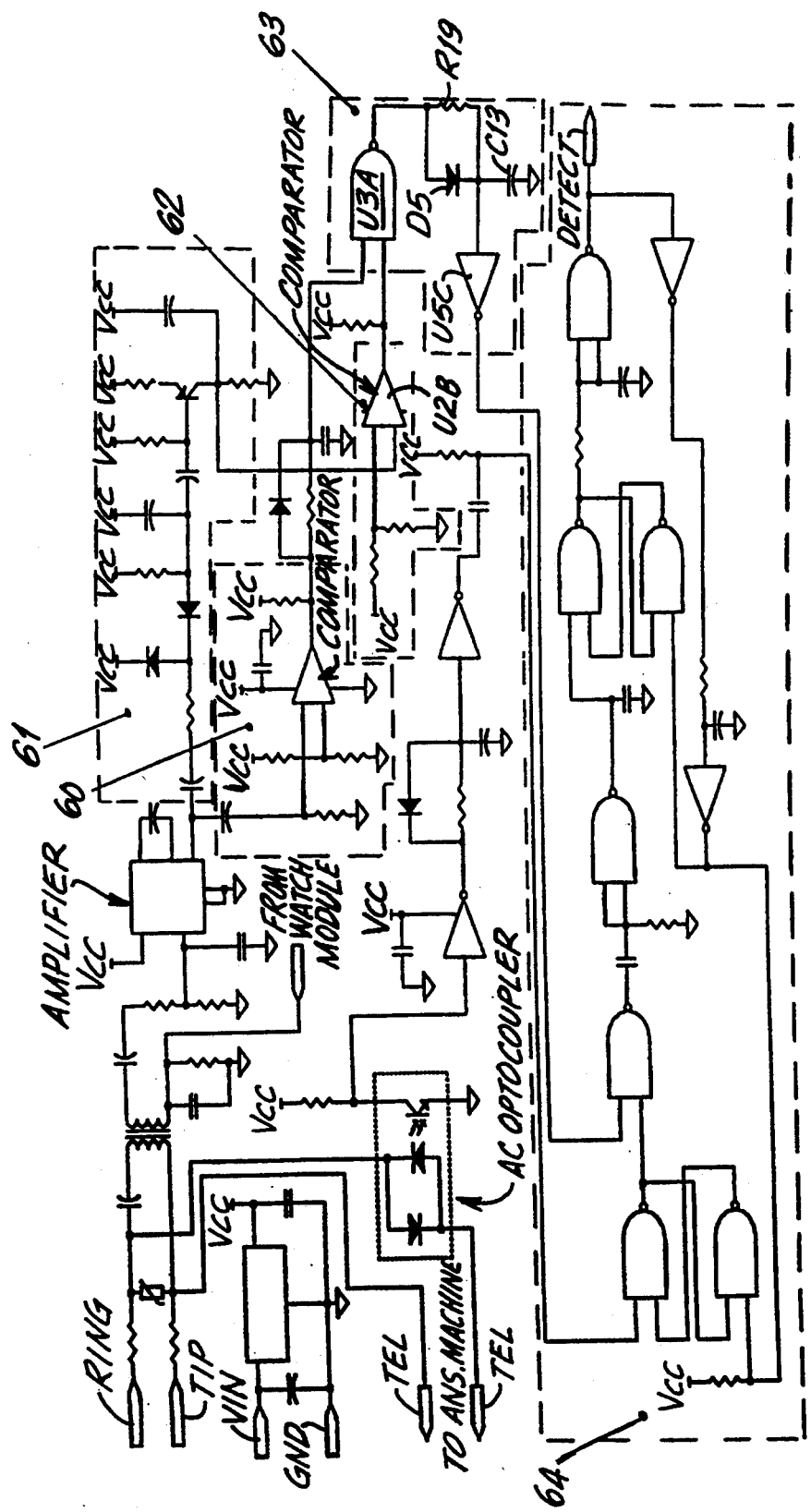
FIG. 6 is a schematic of a working high-reliability "Beep" Detector using a logical ANDing of a "steady-state detector" and an audio detector.

FIG. 6 is a schematic of a working high-reliability "Beep" Detector, again using a common LM393 comparator. It can be seen that the phone-line interface and LM386 amplifier are similar to those employed in FIG. 5, and a current sensing pickup-detector is employed as per FIG. 4. Additionally, this particular circuit is designed to produce a single strobe output 5 seconds after the end of a "beep", which will not then re-trigger until after a hangup is sensed, making the signal suitable for direct application to the "talk key" input of an incorporated clock or watch module wired to the associated telephone line. The circuit block 64 provides this portion of the logic using two re-triggerable NAND-gate flip-flops. "Beep" detection is provided by the logical ANDing (via the NAND gate U3A in block 63) of a simple audio detector (block 60) and a "steady state" detector (blocks 61 and 62). The "steady state" (S/S) detector is of a type well known to the state of the art, often used in TADs to detect the end of an incoming message or call. Like an audio detector, it responds initially to any audio signal by changing state, however, if the signal continues at a fixed ("steady") relative amplitude and frequency, the output resumes a quiescent state. In TADs, this is used to detect a steady dialtone at the end of a call, but any steady tone will cause it to behave similarly. In operation, then, the output of the audio detector (pin 1 of the U2A in block 60) goes high whenever any audio signal is detected on the line, but the output of the comparator (block 62) driven by the S/S detector (block 61) will only transiently go high with it, falling back into a quiescent state if the signal persists. It can be seen that this logic state (the S/S detector quiescent and the audio detector active) is a unique and reliable indication of a steady tone on the line. The NAND gate U3A is used to detect this condition (note the logic-inverted signal/input states of the comparators U2A and U2B), changing state only when the S/S detector shows quiescent (silence or tone) and the audio detector shows NON-silence. The only additional component is a simple R/C filter (block 63, R19, C13, D5, U5C) to de-bounce the outgoing signal, since there is a fundamental speed mismatch in circuit functions (the S/S detector is by nature slow, requiring a timebase "x" past which to call a signal "steady"). Rather than attempting to provide a matching "ramp" to the audio detector output, this particular circuit uses the R/C to de-bounce any detection signals shorter than the S/S detector's timebase (in this case 150-200 mS). Since the entire circuit is gated through current-sensing pickup detection and will trigger only once after any pickup, the entirety of the logic provides extremely high reliability of detection for beeps exclusively from the associated TAD or device.

A factory pre-programmed Voice IC such as the Texas instruments TSP53C32, a typical, low cost, preprogrammed Voice IC can be used. In use, the Word Number corresponding to the desired word is loaded by the controlling device or circuit, then a binary 0 is loaded to tell the IC to "talk." Output is through a quasi-analog 12-bit D/A (digital-to-analog), which can then be amplified as necessary for driving speakers, piezos, phone-interfaces, et al. A factory pre-programmed vocabulary for such use is set forth in the following table.

VOCABULARY TABLE

| Word Number | Word | Word Number | Word |
|---|---|---|---|
| 1 | One | 29 | Friday |
| 2 | Two | 30 | Saturday |
| 3 | Three | 31 | A.M. |
| 4 | Four | 32 | P.M. |
| 5 | Five | 33 | O'Clock |
| 6 | Six | 34 | Please Wait |
| 7 | Seven | 35 | Message |
| 8 | Eight | 36 | Messages |
| 9 | Nine | 37 | No |
| 10 | Ten | 38 | Oh |
| 11 | Eleven | 39 | Zero |
| 12 | Twelve | 40 | On |
| 13 | Thirteen | 41 | Off |
| 14 | Fourteen | 42 | The |
| 15 | Fifteen | 43 | Date |
| 16 | Sixteen | 44 | Unit |
| 17 | Seventeen | 45 | Is |
| 18 | Eighteen | 46 | Full |
| 19 | Nineteen | 47 | Tape |
| 20 | Twenty | 48 | You are ... |
| 21 | Thirty | 49 | You have ... |
| 22 | Forty | 50 | 40 ms Pause |
| 23 | Fifty | 51 | 80 ms Pause |
| 24 | Sunday | 52 | 120 ms Pause |
| 25 | Monday | 53 | 200 ms Pause |
| 26 | Tuesday | 54 | 400 ms Pause |
| 27 | Wednesday | 55 | 800 ms Pause |
| 28 | Thursday | | |

Figure 7A:
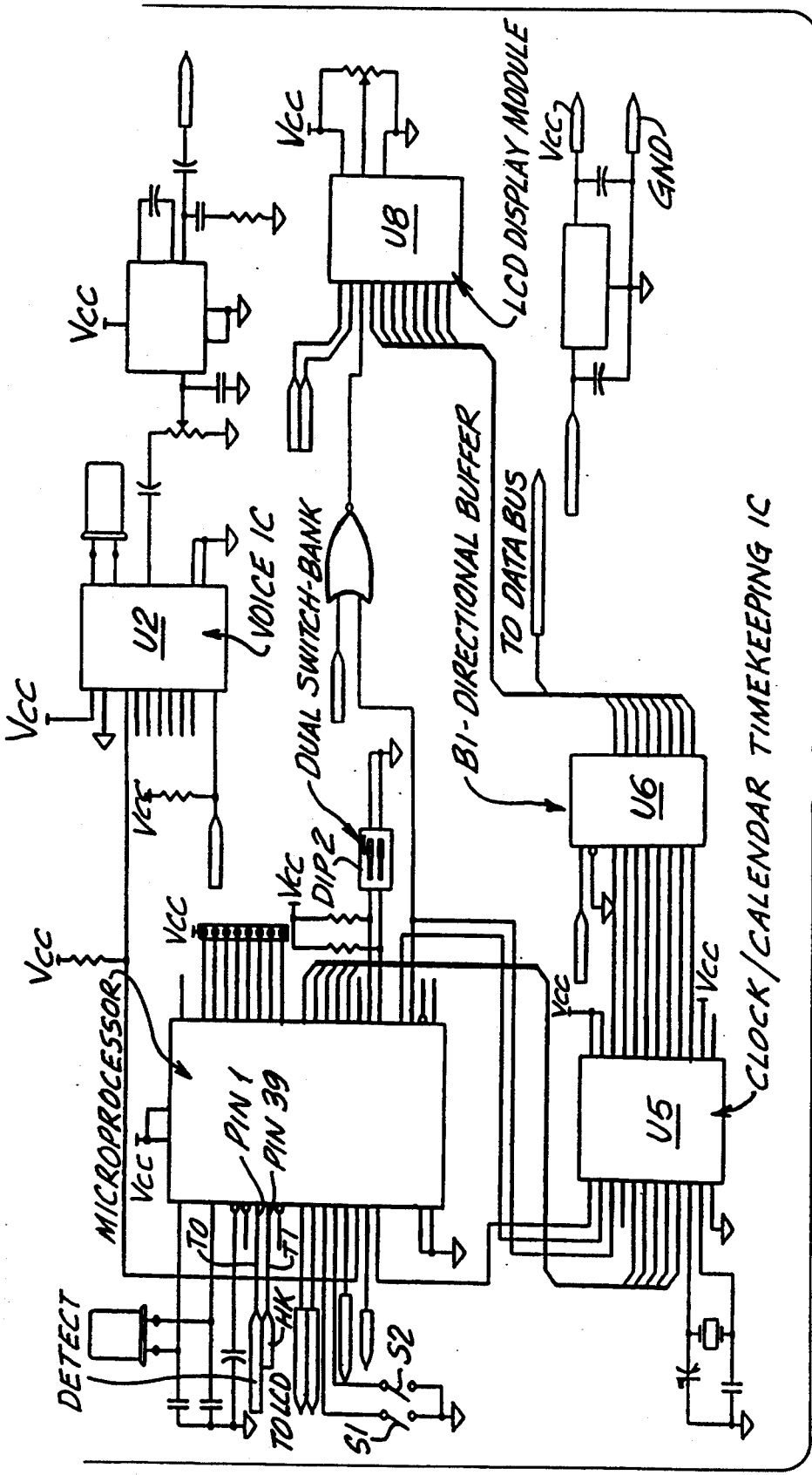
FIGS. 7a and 7b are a schematic of a working serial Timestamp Apparatus with a dot-matrix LCD display and a clock/calendar timekeeping IC.
Figure 7B:
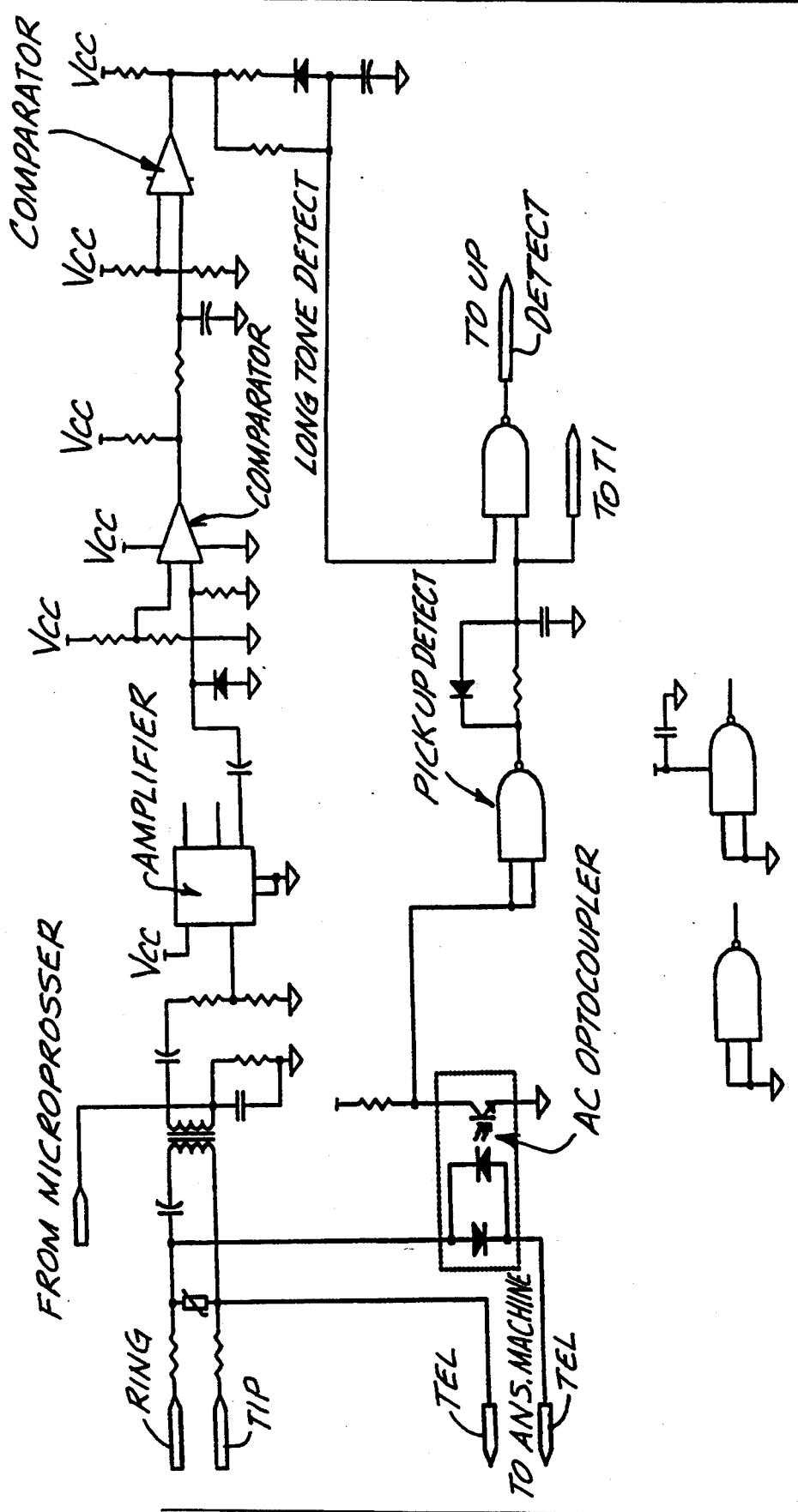

FIGS. 7a and 7b are a schematic of a working serial Timestamp Apparatus with an LCD display module (U8, a Phillips LTN111 1-line-by-16-character dot-matrix) and a clock/calendar timekeeping IC (U5, a UMC UM82C8167). The microprocessor shown is an Intel MCS48, which communicates in parallel with both of these external devices. U6 (a 74HC245 bi-directional buffer) is employed because the microprocessor must both read and write U5, while U8 is only written to. Communication with the Voice IC (U2) is through a two-line serial hookup, one clock and one data. In this implementation, the software is configured to display the time, day and date at all times, setting them according to button-switches S1 (a "SET" key) and S2 (an "INCREMENT" key). The device has no "manual" timestamping capability, responding only to the TO (microprocessor pin 1) signal provided by a logically ANDed Beep Detector and serial Pickup Detector, which are employed just as illustrated in FIGS. 5 and 4, respectively. Note, however, that a simple grounding button could be hooked directly to this (TO) pin in order to provide the capability, since pulling TO arbitrarily low will "fool" the microprocessor into "speaking" as if a valid, ANDed and de-bounced signal had come in from the detectors. This is the type of "manual" triggering mechanism contemplated in FIGS. 1 and 2. Note additionally that the dual switch-bank DIP-2 allows the user to select the type and amount of timestamp data provided. Closing one will cause the microprocessor to omit the day, the other to omit the date, thereby allowing the combinations of time-only, time-day, time-date, or time-day-date to be fully user specified. Note also that a direct "hook-detect" (HK, microprocessor pin 39) signal is additionally tapped from the Pickup Detector before the logical ANDing of the signals. The microprocessor uses this signal (applied to its T1 input, pin 39) to avoid repeating itself from potential additional beeps, basically becoming quiescent (unresponsive to the TO input) after "speaking" and waiting for a hangup before doing so again.

Figure 8A:
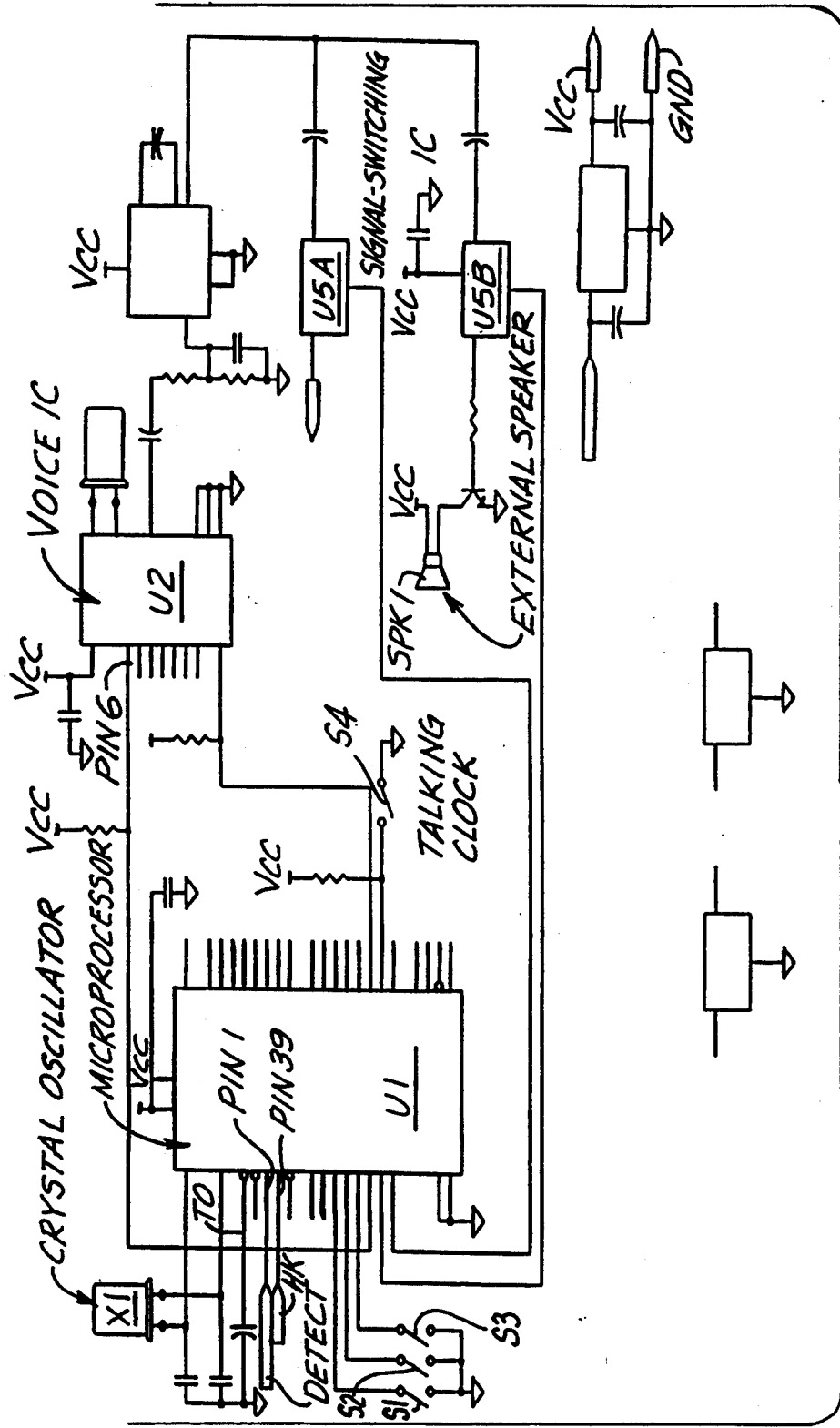
FIGS. 8a and 8b are a schematic of a working serial Timestamp Apparatus with no display and timekeeping done by the microprocessor using a 7.3728 MHz crystal oscillator.
Figure 8B:
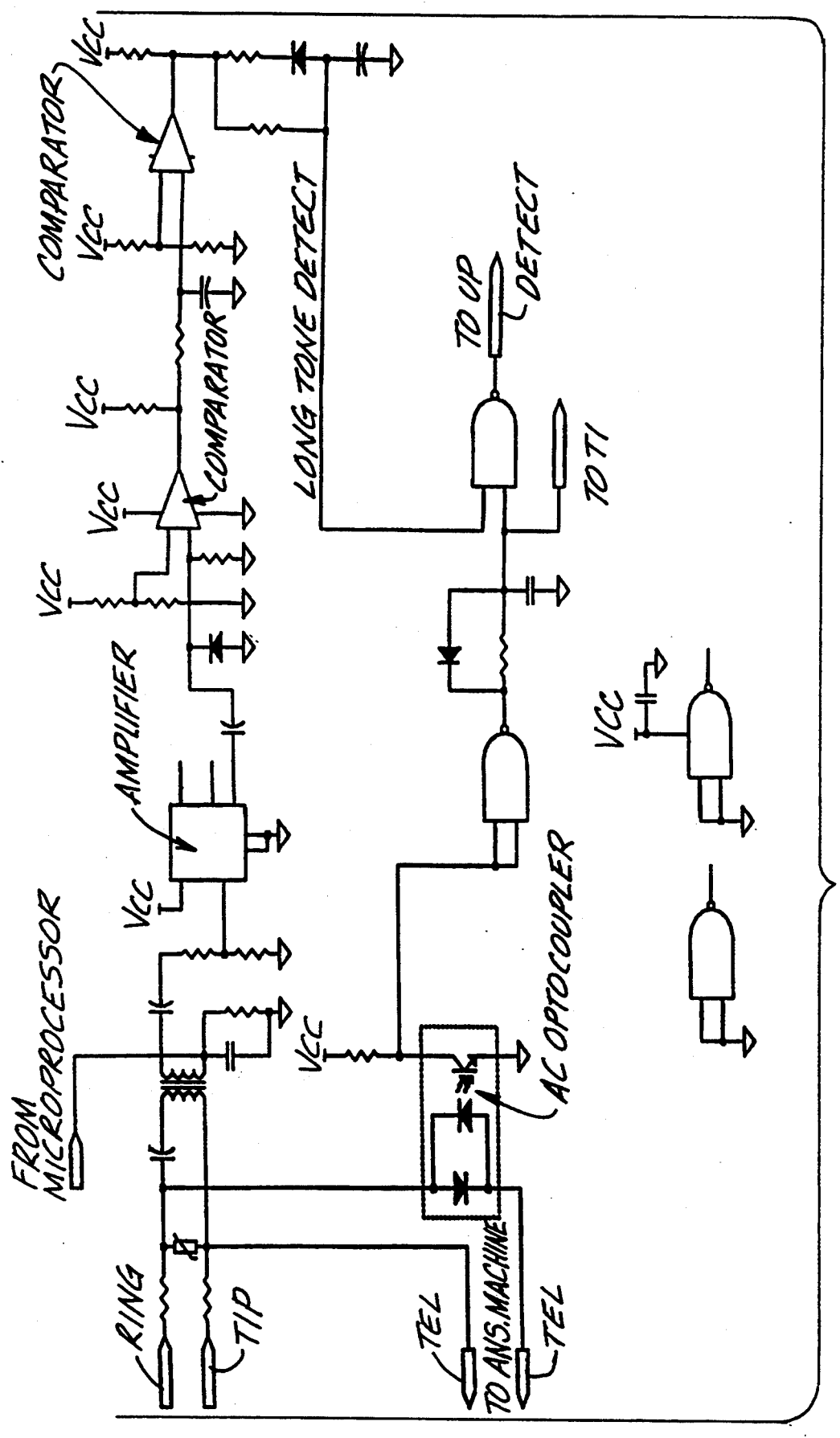

FIGS. 8a and 8b are a schematic of a working serial Timestamp Apparatus with no display and timekeeping done by the microprocessor (U1) using a 7.3728 MHz crystal oscillator (X1). The microprocessor shown is an Intel MCS48 whose instruction clock (jiffy) is a divide-by-15 of the crystal, and whose timer clock is a further divide-by-32 of the jiffy. This yields a full (8-bit, 256-counts) timer of exactly 1/60th of a second. The software can thus easily do realtime timekeeping using the internal timer IRQ with no other help. Communication with the Voice IC (U2) is through a two-line serial hookup, one clock and one data. In this implementation, the software is configured to set the time by "voice-response" according to button-switches S1 (a "SET" key) and S2 (an "INCREMENT" or "INC" key), and for this purpose the microprocessor diverts the output from the Voice IC (U2) temporarily to an external speaker (SPK1) via U5A and U5B, two gates of a 4016 signal-switching IC. The device also uses this arrangement to double as a "talking clock" if switch S4 is closed by the user. Note that in order to allow fast incrementation of the data during setting, the microprocessor can abort any "already-spoken" data upon the next detected INC keypress by pulling down the INIT (U2 pin 6) line to the Voice IC, resetting it immediately for loading of the new (incremented) data. The device "speaks" only a combined time and day-of-week timestamp, with no user selectability. Button-switch S3, however, causes the software to "talk" on demand, either to the phone line only or the phone line and the speaker, depending upon S4. Note that the device employs a Beep Detector and a serial Pickup Detector just as illustrated in FIGS. 5 and 4, respectively. Note also that a direct "hook-detect" (HK, microprocessor pin 39) signal is additionally tapped from the Pickup Detector before the logical ANDing of the signals. The microprocessor uses this signal (applied to its T1 input, pin 39) to avoid repeating itself from potential additional beeps, basically becoming quiescent (unresponsive to the TO input) after "speaking" automatically and waiting for a hangup before doing so again.

FORMAT OUTLINE

In order to present a clearer understanding of the specification, the requirements for implementing the teachings of the invention will be described in connection with the various logical requirements of the device. Examples will be set forth of the types of information which a device might or must generically collect in order to function in connection with the user and a line-associated TAD. One skilled in the art will immediately understand that there are thousands of ways in which the concepts of this invention could be variously implemented in actual devices. All the figures, methods, and information cited herewith are illustrative only, and all such ways and permutations are deemed to be within the spirit, scope and teachings of the claims appended to this specification.

INPUT SIGNALS

User Supplied Information

Time

Primarily, the user may beed to supply initial time (and possibly calendar) information to the device. The most basic implementations of the device might supply only the time of day, or the time and day-of-week (i.e., Sunday, Monday, etc.), but some initial user input may obviously be necessary in this regard. The simple two-button setup shown in FIGS. 7a, 7b and 8a, 8b is exemplary of such systems, using only a "SET" and an "INCREMENT" key to accomplish the setting of all time functions. Such key algorithms are ubiquitous in common clocks and watches, and can be implemented in thousands of ways depending upon the needs and complexity of the device. We will not, therefore, delve into details of them here.

Configuration

Since the type and amount of timestamp information supplied by the device could obviously be user-selectable, and since the device itself could also function in other modes (e.g., a "talking clock") without conflicting with its basic functions, some sort of configuration switches or buttons might obviously be included to allow the user to make optimal use of the device according to his own needs.

Circuit and Line Supplied Information

Pickup/Hangup

Since the device is primarily intended to function as an adjunct to a line-associated TAD, one desirable internal attribute of the device is the ability to discriminate when the line is in use. In a "parallel" implementation, wherein the device is designed to occupy the line anywhere, this can most easily be accomplished by monitoring the DC line voltage, which typically falls from 48 V in an on-hook condition to 10 V or less when any associated phone or device goes off-hook. Such voltage-drop detection can be accomplished by a device as simple as a zener diode, but can be made as complex and discriminatory as the designer desires. In a "serial" implementation, wherein the device is designed to reside directly between the TAD and the telephone line, it is further possible to discriminate not only when the line is in-use ("off-hook"), but that the source of the off-hook is the TAD itself. This is because when the device is in series, all line current flowing to the TAD must first pass through the device. This current will be absent or very small (10 microamps or less) when the TAD is on-hook, and will rise into the milliamp range when the device goes off-hook. Any of a number of common current-detector circuits can thus be used to isolate the TAD as the source of the off-hook signal, unaffected by other parallel telephones or devices on the line.

Tone

Since, in general, the automatic function of the device should provide a timestamp to the line only when the associated TAD is recording, it is necessary to distinguish this. Since the vast majority of common TADs generate an audio frequency tone at the start of recording, this can be effectively accomplished by monitoring the line for such tones. They are generally a fixed single frequency falling between 700 and 2000 Hz (a range above the frequency range of telephone company tones), with 1000 Hz being archetypical. These "beeps" usually persist for at least half a second, and (since the device is at least on the same local circuit as the TAD, and is therefore geographically and physically nearby) have an amplitude of at least voice-conversational level. This gives the designer ample tools, using well-known bandpass filter/detectors, amplitude filter/detectors, and common timing components, to construct a circuit which will reject the vast majority of extraneous audio signals. The output from such a circuit, if sufficiently discriminatory, might be used alone as a trigger for the timestamping device, however, since TAD tones occupy a range of frequency, amplitude, and duration characteristics, such a circuit will be most broadly effective if coupled to and/or gated by a pickup/hangup detector which first isolates the TAD (or at least the phone line) as being active (see above). The Beep Detectors in FIGS. 5 and 6 exemplify the usefulness of such circuitry, relying on external pickup detection and software/hardware timing to provide reliable rejection of voice and other spurious signals. More self-reliability can be added to embodiments such as FIG. 5 by adding high-pass capability, or (since most TAD signals are simple, single-frequency "puretones") one or more phase-locked loops (such as the ubiquitous National LM565s or LM567s) could be implemented in place of discrete circuitry. There are many other ways of accomplishing this end.

Timekeeping

There are obviously many circuits and IC's that can be used for timekeeping, since this type of function is practically as old as digital circuitry itself. There are numerous IC's and IC modules (such as wristwatch modules) that such a device might make use of for these purposes, or, if a microprocessor were employed as a controller for the device, an appropriate crystal oscillator and software would allow the microprocessor to self-maintain these activities as an integral part of its control functions.

OUTPUT SIGNALS

Audio

The only necessary output from the basic invention is a voice-audio signal containing time, calendar, or time-and-calendar data (a timestamp). There are numerous voice ICs available which could meet the requirements, including a number from manufacturers as ubiquitous as NEC, OKI, and Texas Instruments (TI). The TI TSP53C32/33 illustrated in FIGS. 7a, 7b and 8a, 8b is an example of a dedicated voice IC compatible with the aims of the invention, accepting a serial or parallel data input from a controlling circuit or device (in the figures, an Intel MCS48 series microprocessor) and producing synthesized speech on command according to that data. The manufacturer-preprogrammed vocabulary of one of these ICs is illustrated in the above Vocabulary Table, but "custom" vocabularies can alternatively be masked by the manufacturer according to customer needs. In the figures, the microprocessor merely obtains (FIGS. 7a, 7b) or keeps (FIGS. 8a, 8b) time data and assembles a corresponding string of voice data when called for, passing this string to the voice IC and commanding it to "talk". The voice IC then produces a synthetic voice signal output. Normally, for purposes of the invention, this output would be to the telephone line via appropriate interface circuitry, but the microprocessor might alternatively divert it elsewhere (e.g., to an external speaker) to accomplish optional subfunctions (e.g., "talking clock" or "voice-timeset" functions). Note also that there is nothing to fundamentally preclude the timestamp data from being coded (i.e., passed in a "non-voice" audio format such as a brief burst of digital FSK on a carrier) except for the need for later translation on playback. Compatible hardware could, however, certainly use such a setup, and the term "audio" as encompassed herein is intended to encompass such non-voice signals as can be passed over an (inherently "audio") telephone line.

Visual

Since the device must basically function as at least a time-of-day clock, and since setting the time and/or calendar information with only voice response is inherently more time-limited than a visual display, it may be desirable to drive a visual display as a useability adjunct. There are many types of displays which will accomodate clock and calendar functions, and likewise many ways of driving them. LCDs such as those typical of digital watches are one example. Since this is an adjunct subfunction of the invention, and since its implementation is very well known to the state of the art, there will be no delve into the details of display technology here.

What is claimed is:

1. An audio frequency actuating signal responsive system for effecting actuation of associated time day stamp information means, said system comprising:
    an electrical apparatus, said electrical apparatus and said time day stamp information means being coupled to a common telecommunications line;
    said electrical apparatus including line pickup detection means for detecting an occurrence of either one of respective on-hook and off-hook conditions of said line;
    said electrical apparatus further including audio frequency actuating signal responsive means, first logic ANDing means and second logic ANDing means;
    a telephone answering device capable of outputting an audio frequency actuating signal also being coupled to said common telecommunications line, said telephone answering device including at least ring signal responsive means to effect said off-hook condition;
    said line pickup detection means in response to a detection of said off-hook condition producing a first gating signal;
    said audio frequency actuating signal having prescribed characteristics And being generated and applied to said line by said telephone answering device in response to a ring signal appearing on said line;
    said audio frequency actuating signal responsive means in response to a detection of said audio frequency actuating signal producing third and fourth gating signal;
    said second logic ANDing means in response to said third and fourth gating signals producing a second gating sign,al, said prescribed characteristics of said audio frequency actuating signal being a steady state audio frequency signal of pre-fixed amplitude and frequency bandpass parameters, said audio frequency actuating signal being sustained for at least a pre-fixed timed duration;
    said first and second gating signals being applied to said first logic ANDing means to produce an actuating output signal;
    said audio frequency actuating signal responsive means including a steady state signal detection means and an audio signal detection means;
    said steady state signal detection means outputting said third gating signal upon detection and validation of said audio frequency actuating signal as to its steady state characteristics;
    said audio signal detection means outputting said fourth gating signal upon detection and validation of said audio frequency actuating signal as to its audio characteristics; and said actuating output signal upon application to said time day stamp information means effecting an operational function of said time day stamp information means.

2. In a signal responsive system in accordance with claim 1, wherein said telephone answering device includes outgoing message playout means, said telephone answering device being responsive to said ring signal appearing on said line to deliver an outgoing message followed by a beep tone signal onto said line, said beep tone signal constituting said audio, frequency actuating signal.

3. In a signal responsive system in accordance with claim 2, wherein said time day stamp information means upon actuation outputting an audible marker signal as to at least one time, day and date information; and wherein pursuant to said off-hook condition and presence of said beep tone signal on said line and further pursuant to validation of said beep tone signal by said audio frequency actuating signal responsive means, said actuating output signal actuating said time day stamp information means to deliver said audible marker signal onto said line.

4. In a signal responsive system in accordance with claim 3, wherein said telephone answering device further includes recording means, said recording means being activated into a recording mode following said beep tone signal play out, said recording means recording any signals appearing on said line during said recording mode; and wherein said recording means records said audible marker signal appearing on said line pursuant to actuation of said time day stamp information means and said recording mode.

5. In a signal responsive system in accordance with claim 3, wherein said audio frequency actuating signal responsive means includes inhibiting circuit means; and wherein said audio frequency actuating signal responsive means, as the second gating signal is produced, is disabled until after said line pickup detection means detects a restoration of the on-hook condition of said line thereby avoiding the potential of said time day stamp information means being triggered more than once during said off-hook condition of said line.

6. In a signal responsive system in accordance with claim 1, wherein said time day stamp information means upon actuation outputting an audible marker signal as to at least one time, day and date information;

wherein pursuant to said off-hook condition and presence of said audio frequency actuating signal on said line and further pursuant to validation of said audio frequency actuating signal by said audio frequency actuating signal responsive means, said actuating output signal actuating said time day stamp information means to deliver said audible marker signal onto said line; and wherein said telephone answering device includes an audio signal recording apparatus provided with at least a recording mode function capable of at least recording audio input signals, said audio signal recording apparatus recording said audio marker signal appearing on said line pursuant to actuation of said time day stamp information means.

* * * * *